(12) United States Patent
Seppälä et al.

(10) Patent No.: US 10,556,136 B2
(45) Date of Patent: Feb. 11, 2020

(54) HALF FACEPIECE

(71) Applicant: Scott Technologies, Inc., Boca Raton, FL (US)

(72) Inventors: Antti Seppälä, Vaasa (FI); Robert Charles Sutton, Merseyside (GB); Amy Elizabeth Quiring, Matthews, NC (US); Michael Parham, Weddington, NC (US)

(73) Assignee: Scott Technologies, Inc., Boca Raton, FL (US)

( * ) Notice: Subject to any disclaimer, the term of this patent is extended or adjusted under 35 U.S.C. 154(b) by 975 days.

(21) Appl. No.: 14/528,159

(22) Filed: Oct. 30, 2014

(65) Prior Publication Data

US 2015/0053206 A1 Feb. 26, 2015

Related U.S. Application Data

(63) Continuation of application No. PCT/US2013/038816, filed on Apr. 30, 2013.

(60) Provisional application No. 61/640,531, filed on Apr. 30, 2012.

(51) Int. Cl.
| | | |
|---|---|---|
| A62B 23/00 | (2006.01) |
| A62B 18/00 | (2006.01) |
| A62B 23/02 | (2006.01) |
| A62B 18/02 | (2006.01) |
| A62B 9/00 | (2006.01) |
| A62B 18/08 | (2006.01) |
| A62B 18/10 | (2006.01) |
| B23P 6/00 | (2006.01) |

(52) U.S. Cl.
CPC ............ *A62B 23/025* (2013.01); *A62B 9/003* (2013.01); *A62B 18/025* (2013.01); *A62B 18/082* (2013.01); *A62B 18/084* (2013.01); *A62B 18/10* (2013.01); *B23P 6/00* (2013.01); *Y10T 29/4973* (2015.01)

(58) Field of Classification Search
CPC ... A62B 18/025; A62B 18/082; A62B 18/084; A62B 18/10; A62B 23/025; A62B 9/003
See application file for complete search history.

(56) References Cited

U.S. PATENT DOCUMENTS

| | | | | |
|---|---|---|---|---|
| 4,549,543 A | * | 10/1985 | Moon | A62B 18/025 128/206.12 |
| 4,951,664 A | * | 8/1990 | Niemeyer | A62B 18/025 128/205.27 |

(Continued)

FOREIGN PATENT DOCUMENTS

| | | |
|---|---|---|
| EP | 0258508 A1 | 3/1988 |
| JP | 2006-034322 | 2/2006 |

OTHER PUBLICATIONS http://www.thefreedictionary.com/molded.*

*Primary Examiner* — Bradley H Philips
(74) *Attorney, Agent, or Firm* — Christopher & Weisberg, P.A.

(57) ABSTRACT

A half facepiece respirator has a shaped support piece supporting and fixing the position of a particle or paper filter insert or outsert with either the support piece or the particle filter incorporating a face sealing component. Placed within the shaped support piece, a grille may be placed in the lower section of the shaped support piece. Additionally the half facepiece includes a head harness having a release mechanism.

12 Claims, 7 Drawing Sheets

(56) References Cited

U.S. PATENT DOCUMENTS

| | | | |
|---|---|---|---|
| 5,617,849 A * | 4/1997 | Springett | A62B 27/00 |
| | | | 128/201.23 |
| 6,497,232 B2 | 12/2002 | Fecteau | |
| 6,732,733 B1 * | 5/2004 | Brostrom | A62B 18/084 |
| | | | 128/206.27 |
| 7,527,057 B2 | 5/2009 | Fecteau | |
| 2007/0044802 A1 | 3/2007 | Horne | |
| 2009/0151734 A1 | 6/2009 | Park | |
| 2009/0235934 A1 | 9/2009 | Martin | |
| 2010/0154805 A1 | 6/2010 | Insley | |
| 2012/0042878 A1 * | 2/2012 | Woo | A62B 18/025 |
| | | | 128/206.15 |

* cited by examiner

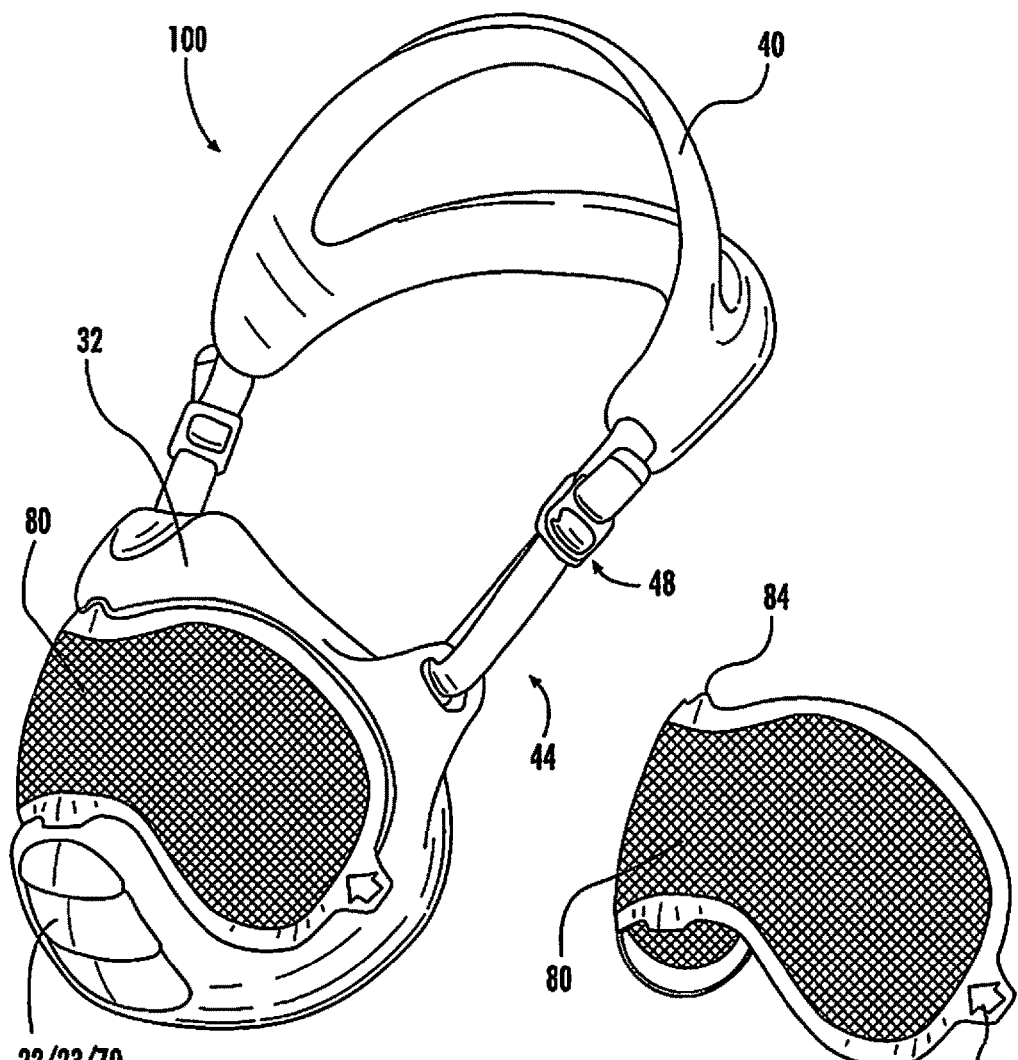
FIG. 5
FIG. 6
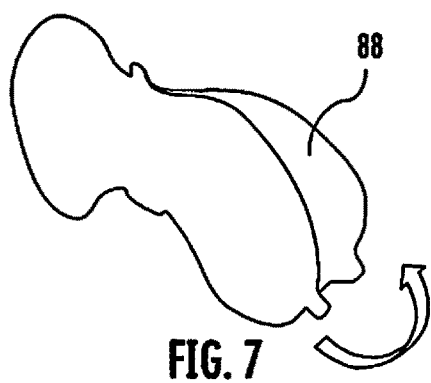
FIG. 7

HALF FACEPIECE

CROSS-REFERENCE TO RELATED APPLICATIONS

This application is a continuation of International Application No. PCT/US13/38816 filed Apr. 30, 2013, which claims the benefit of U.S. Provisional Patent Application No. 61/640,531 filed Apr. 30, 2012, the contents of which are incorporated herein by reference.

FIELD OF THE INVENTION

The present disclosure relates generally to half facepiece protective equipment for emergency personnel or industrial work.

BACKGROUND OF THE INVENTION

A half facepiece respirator has a shaped support piece supporting and fixing the position of a particle or paper filter insert or outsert with either the support piece or the particle filter incorporating a face sealing component. Placed within the shaped support piece, a grille may be placed in the lower section of the shaped support piece. Additionally the half facepiece includes a head harness having a release mechanism.

BRIEF DESCRIPTION OF THE DRAWINGS

The accompanying drawings, which are incorporated herein and constitute part of this specification, illustrate exemplary embodiments of the invention, and together with the description above, serve to explain further features of the invention.

FIG. 5 illustrates a press on and peel-off type filter embodiment of the half facepiece;

FIG. 6 illustrates the filter of FIG. 5;

FIG. 7 further illustrates the removal of a paper component protecting a glue on the filter shown in FIG. 6;

DETAILED DESCRIPTION OF THE PREFERRED EMBODIMENT

Figure 1:
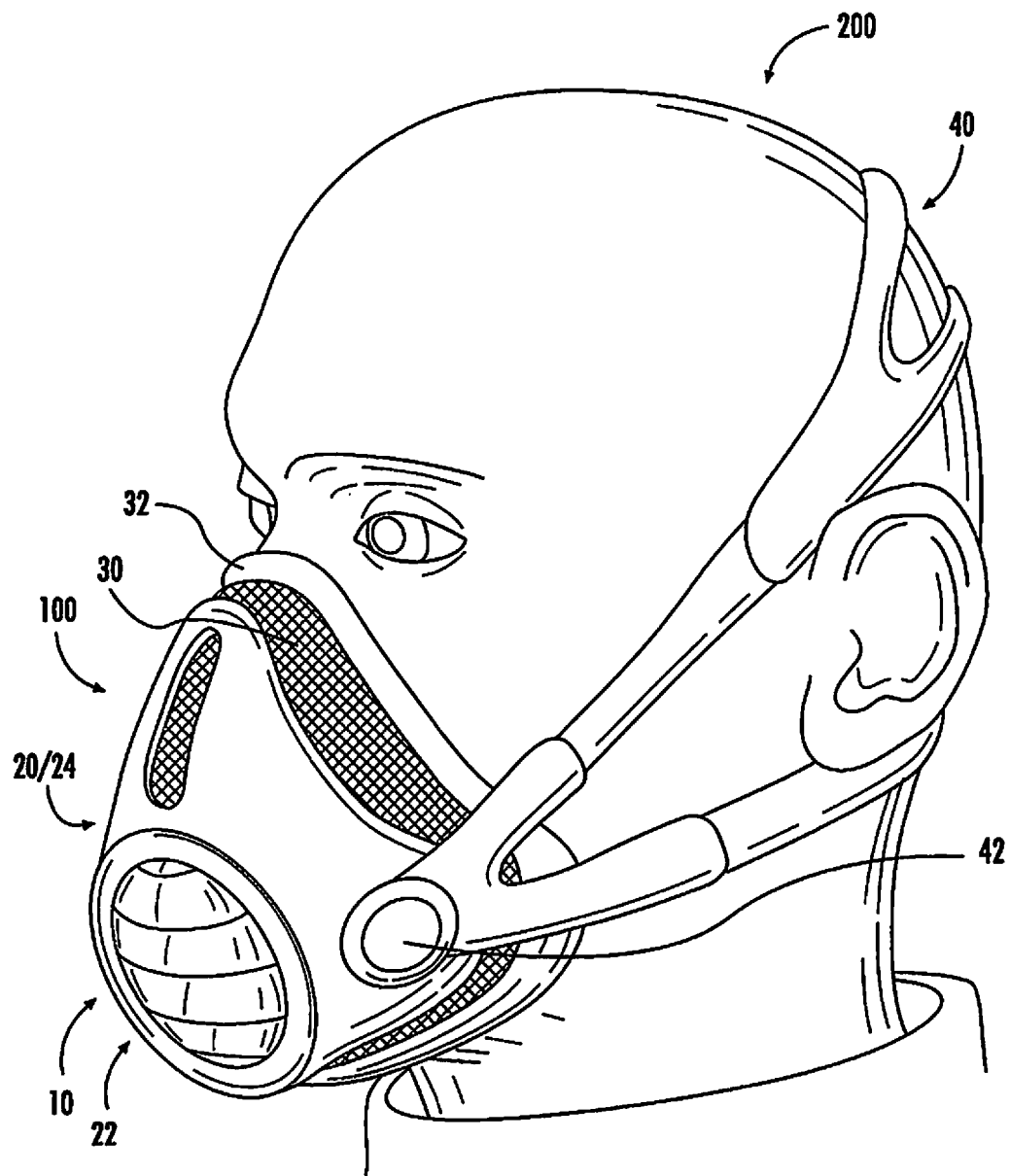
FIG. 1 illustrates a person wearing the half facepiece of the invention.

The invention includes multiple improvements for half facepiece personal protective equipment. As seen in FIG. 1, a person 200 is wearing the invention which includes a half facepiece 100, also referred to as a mask, for personal protection that is conveniently worn by the user 200. The half facepiece 100 has a shaped support piece 20 supporting and fixing the position of a particle or paper filter 30 insert with either the support piece 20 or the particle filter 30 incorporating a face sealing component 32. Placed within the shaped support piece 20, a grille 22 is configured in the lower section of the shaped support piece 20. Additionally the half facepiece 100 includes a head harness 40 having a release mechanism 42.

Figure 2:
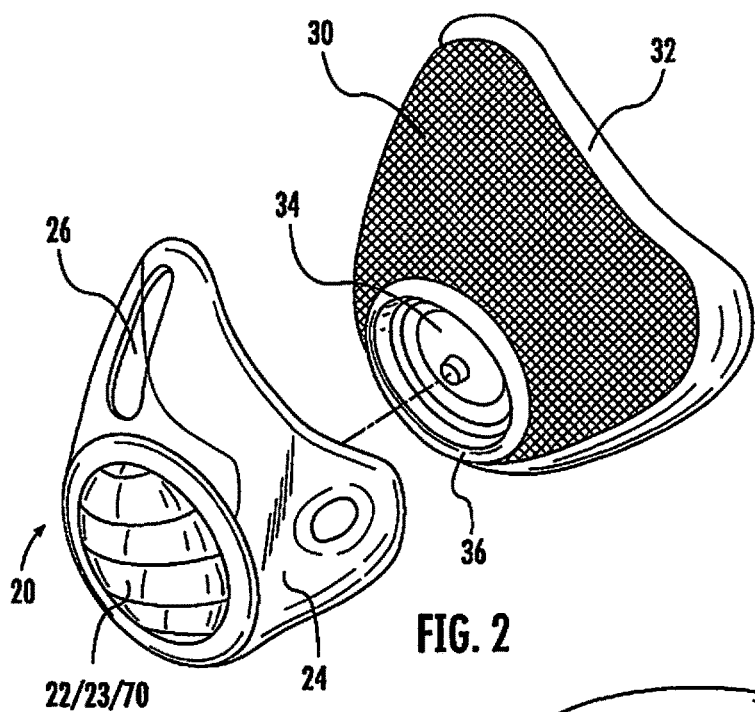
FIG. 2 illustrates a separated view of front grille section and filter of the half facepiece.

Referring to FIG. 2, the shaped support piece 20 of the half facepiece 100 is shown separated from the mask filter 30. The support piece 20 includes a molded hardened frame member 24, such as plastic, composite or other light and moldable composition that is preferably transparent allowing for visual inspection of the wearer's 200 mouth, mouth movements and the facial area adjacent to the mouth as well as providing a lighter impression for improved communications. The support piece 20 may be partially or completely transparent. Preferably plastic is used to form a hardened frame member 24 to integrate other parts of the half facepiece 100. The hardened frame member 24 forms an opening 70 for incorporation of the grille 22 or other component, such as an exhaust valve. The grille 22 in the front of the hardened frame member 24 allows for airflow from the outer environment to access the filter 30 while protecting against contamination and spoilage of the filter 30 from splash hazards and other similar liquid contact against the filter 30. The grille 22 may include any appropriate configuration for splash protection of the filter 30, which preferably has slotted overlays of plastic ridges 23 to deflect fluid spray traveling in an approximate line-of-sight trajectory from passing through the grille 22 and contacting the filter 30. As such, the ridges 23 may be individual straight, curved, or multi-faced slats, or other configurations that would interrupt splashed fluids from passing through the grille 22 and contact the filter 30. Additionally the shaped support piece 20 may form an opening 26 for additional airflow from outside of the mask to pass to and through the filter 30. This opening 26 is preferably located close to the wearer's eyes in the upper section of the hardened frame member 24 in an area the is typically curved or angled away from common splash hazards during normal operational wear of the half facepiece 100. The hardened frame member 24 may also include an attachment point 28 for convenient connection, joining and/or adjustment of the hardened frame member 24 with the head harness 40. This attachment point 28 may include an opening, hook, ring, VELCO™, or other like fastening mechanism. Preferably the fastening mechanism includes an opening within the hardened frame member 24 to provide convenient washing and sanitization of the hardened frame member 24 when desired.

The filter 30 of the half facepiece 100 preferably includes a particle filter that is more preferably a shaped molded particle filter 30. The shaped molded particle filter 30 has a sealing edge 32 component, preferably having a composition of silicone, thermoplastic elastomer (TPE) or combination thereof. Silicone and TPE materials include any appropriate silicone rubber or thermoplastic rubbers having thermoplastic and elastomeric properties appropriate for facial contact and filter support. This sealing edge 32 component is molded to the filtering paper 32 to provide a comfortable fit and wear of the half facepiece 100 to the wearer 200. Generally the molded sealing edge 32 includes a rounded and/or textured edge for a comfortable facial contact to increase the area of contact with the wearer's 200 face for extended times of use. As seen in FIG. 2, the shaped molded particle filter 30 includes a large exhaust valve flap 34 integrated into an exhaust valve 36 in a housing, such as a plastic body, where the plastic body can be detached from filter 30. The exhaust valve 36 is in line and adjacent to, when assembled, the back of the grille 22 so as to be protected from being compromised by splash contamination.

Figure 3:
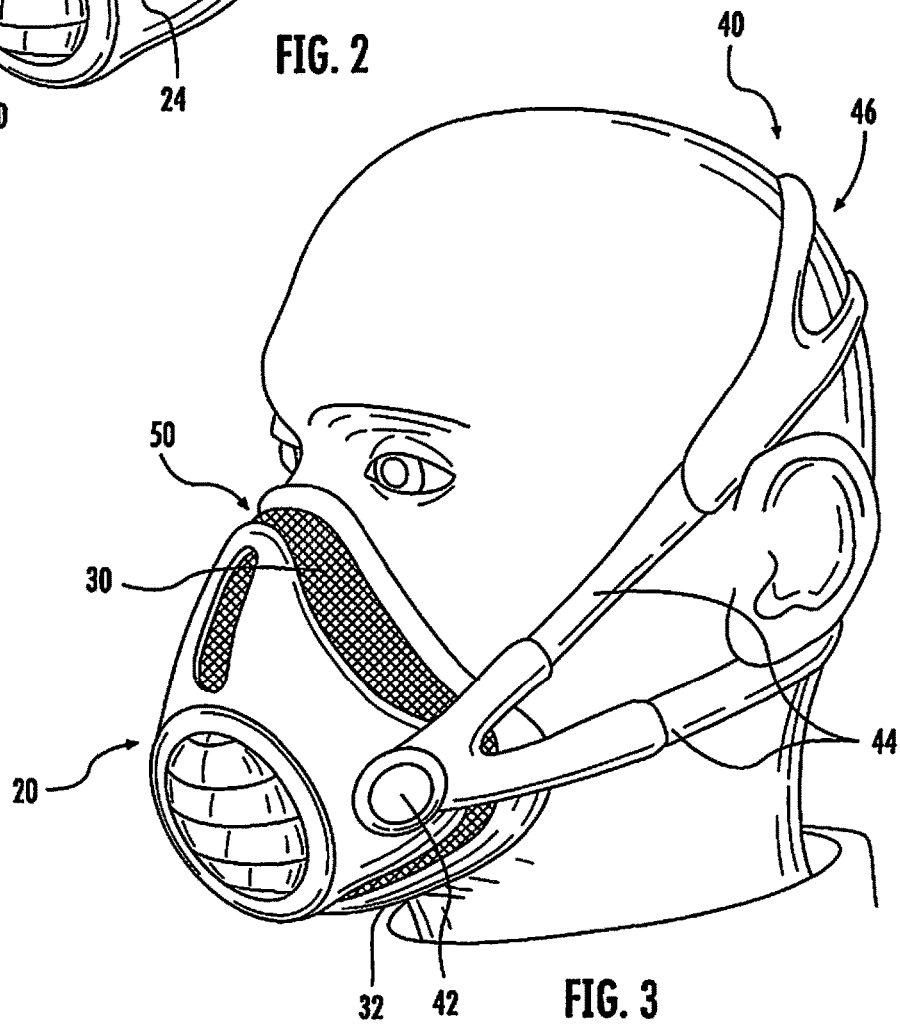
FIG. 3 further illustrates a person wearing the half facepiece of the invention.

Referring to FIG. 3, the head harness 40 of the half facepiece 100 of the invention includes the release mechanism 42 for donning and doffing the mask 100. The release mechanism 42 preferably includes a quick release mechanism used in combination with the attachment point 28 of the hardened frame member 24. The head harness 40 includes support straps 44 for horizontal and vertical support on the user's 200 head, with the support straps 44 preferably configured for a soft textured feel in a permanent shape corresponding to the user's 200 head. Various strap locations and head crown support 46 designs may be used, such as for example without limitation, the multiple strap head crown support 46 design shown in FIG. 3 and alternatively the net head crown support 46 design shown in FIG. 4. Some or all of the head harness 40 support straps 44 may be elastic, generally with tightening mechanisms. As further shown in FIG. 3, a gap between the shaped support piece 20 and molded filter 30 may allow airflow into the filter 30.

Figure 4:
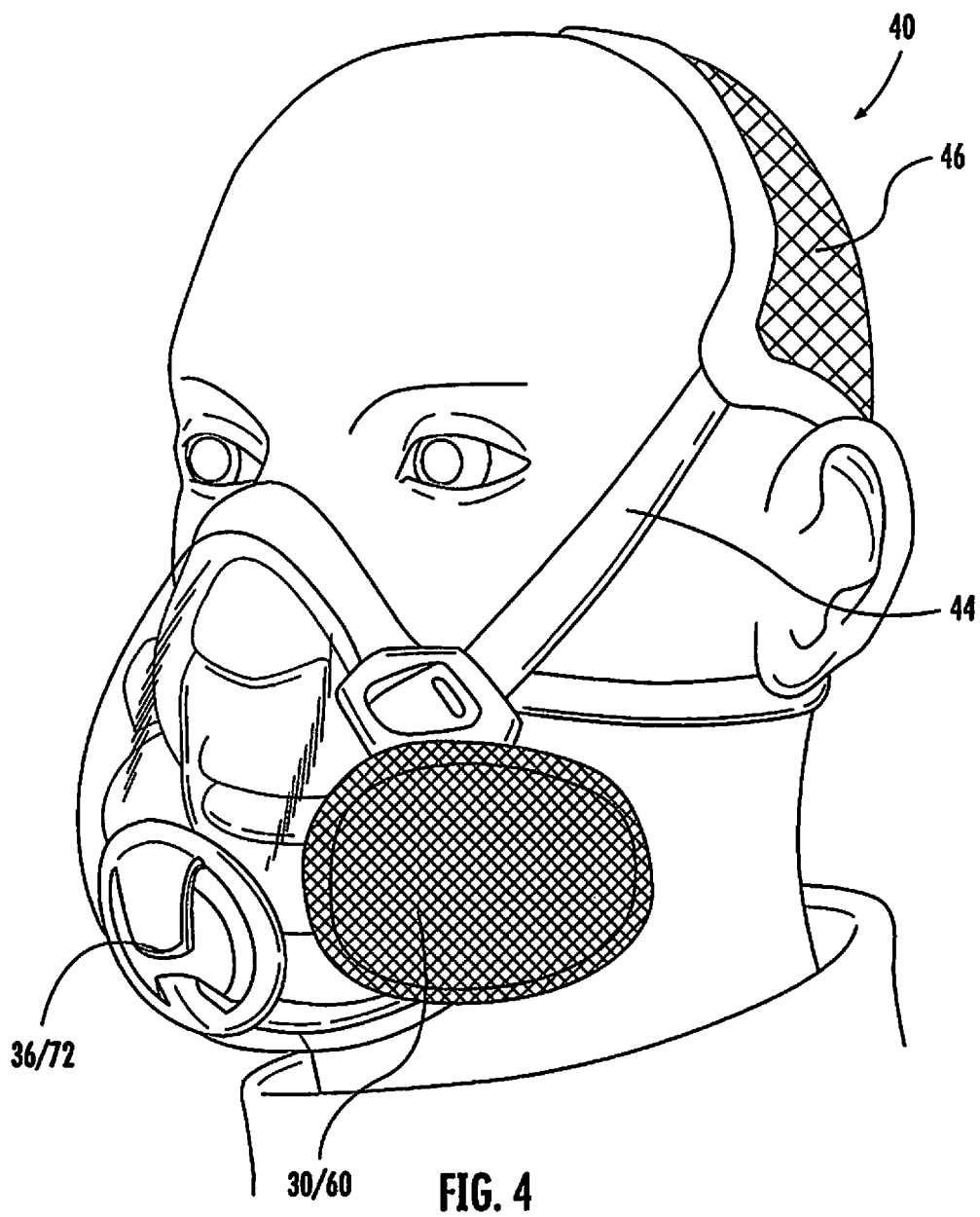
FIG. 4 illustrates an embodiment of the invention having multiple side pancake filters.

As seen in FIG. 4, the half facepiece 100 is shown having a transparent support piece 20 that incorporates the exhaust valve 36 therein located behind a cover 72. In this embodiment, no additional openings are resident in the support piece 20 allowing the support piece 20 to remain air-tight while allow airflow through the attached pancake filters 60. The mask 100 incorporates two laterally positioned pancake-type filters 60 which in an alternative embodiment may be conformal filters 60. The mask 100 in this embodiment may include multiple, e.g., two, pancake type filter preferably with quick attachment/release clips. The support piece 20 incorporates the sealing edge 32 along its perimeter, where the support piece 20 contacts the wearer's 200 face. The mask 100 includes a soft comfortable net type textile harness 40, elastic textile straps 44, adjustable strap length and quick release clips 42.

As seen in FIG. 5, the support piece 20 of the half facepiece 100 includes the silicone and/or TPE molded sealing edge 32, exhaust grille 22 to prevent contamination from splash hazards, the soft and shape permanent head support 40, and support straps 44 with length adjusting mechanisms 48. Additionally the embodiment shown in FIG. 5 includes a changeable peel-off filter paper 80, preferably with air-tight glue joint. In a preferred embodiment, shown in FIG. 6, the peel-off filter paper 80 includes a flat pancake filter with peel-off paper 86 and glue border 84, which as further seen in FIG. 7, has filter peel-off paper 88 that is removed (as shown by the arrow) before the filter 80 is glued to support piece 20 of the respirator.

Figure 8:
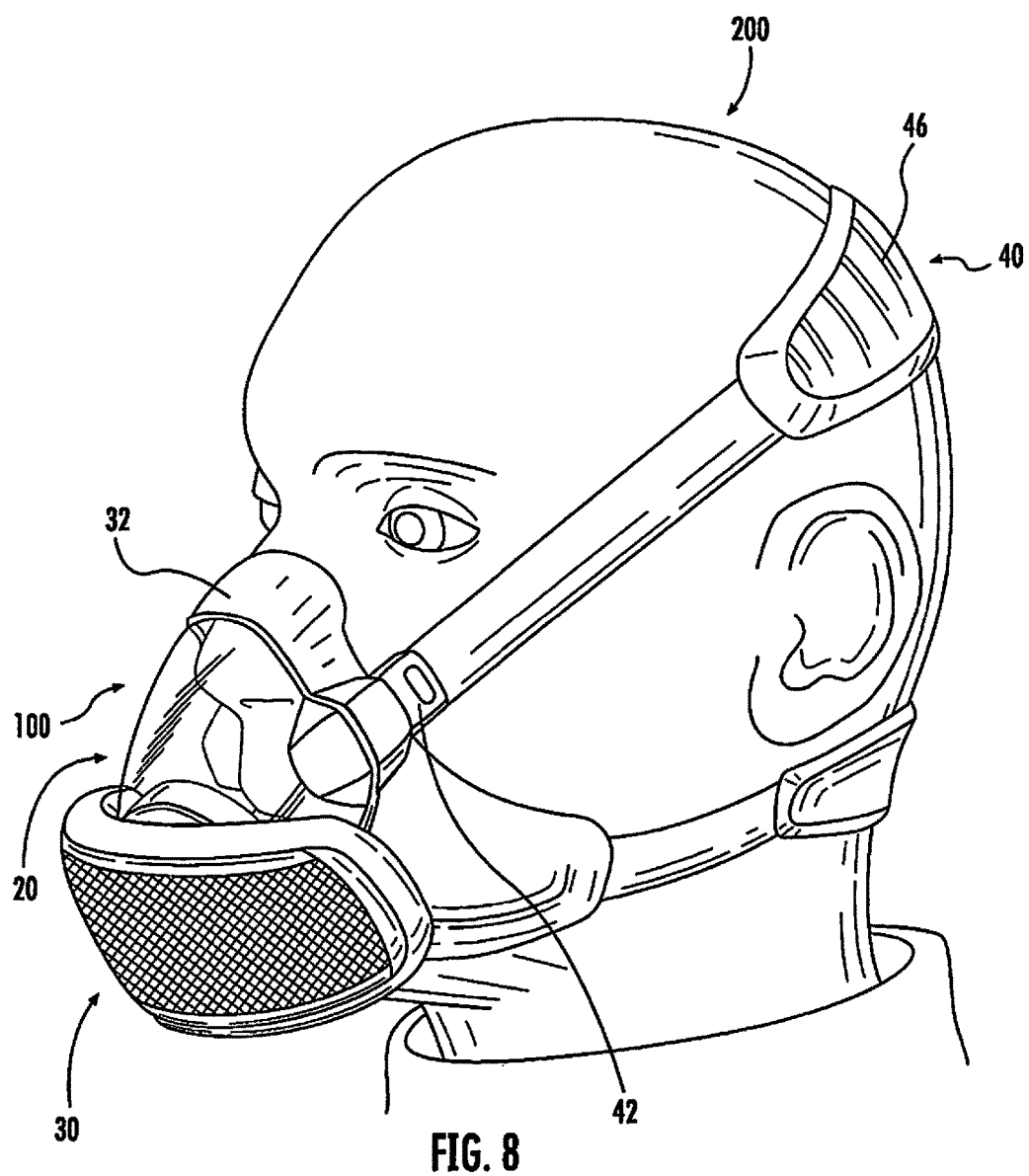
FIG. 8 illustrates a person wearing the half facepiece of an embodiment of the invention having a small motor and impellor for face cooling.
Figure 9:
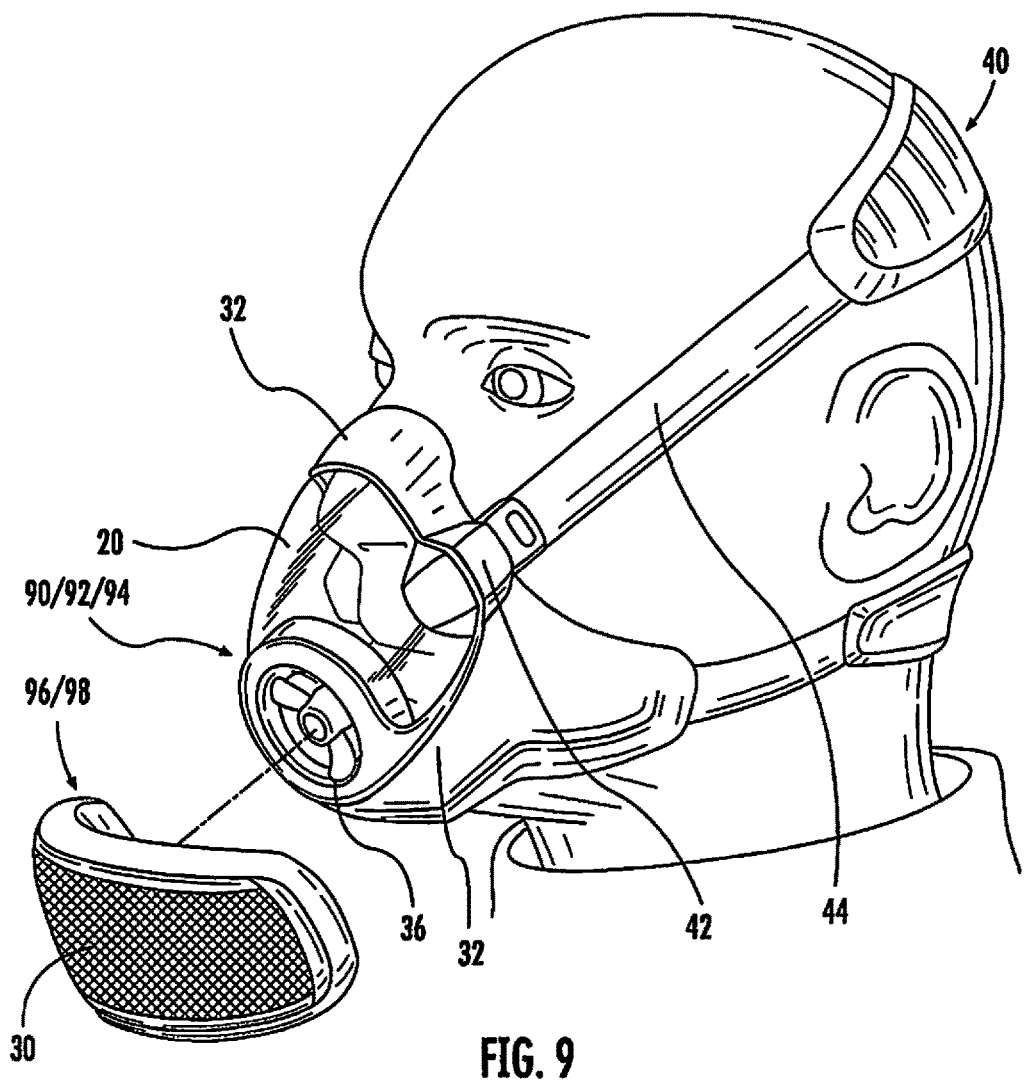
FIG. 9 illustrates an expanded view of the embodiment shown in FIG. 8.

In an alternative embodiment, as seen in FIGS. 8 and 9, the half facepiece 100 of the invention includes a small motor 90 and impellor 92 to cool down the user's 200 face heat and help with breathing, preferably with a blower 94 that also prevents the misting of the transparent plastic front cover of the support piece 20. The embodiment further includes a plastic transparent front cover of a plastic filter body 96 that houses a built-in power source 98, such as a thin Li-battery, and changeable filter paper 30. Also shown re the silicone or TPE face sealing edge 32, exhaust valve 36 located in the lower section of the support piece 20, quick release clip 42 for the head harness 40, and the elastic textile straps 44 of the head harness 40.

Figure 10:
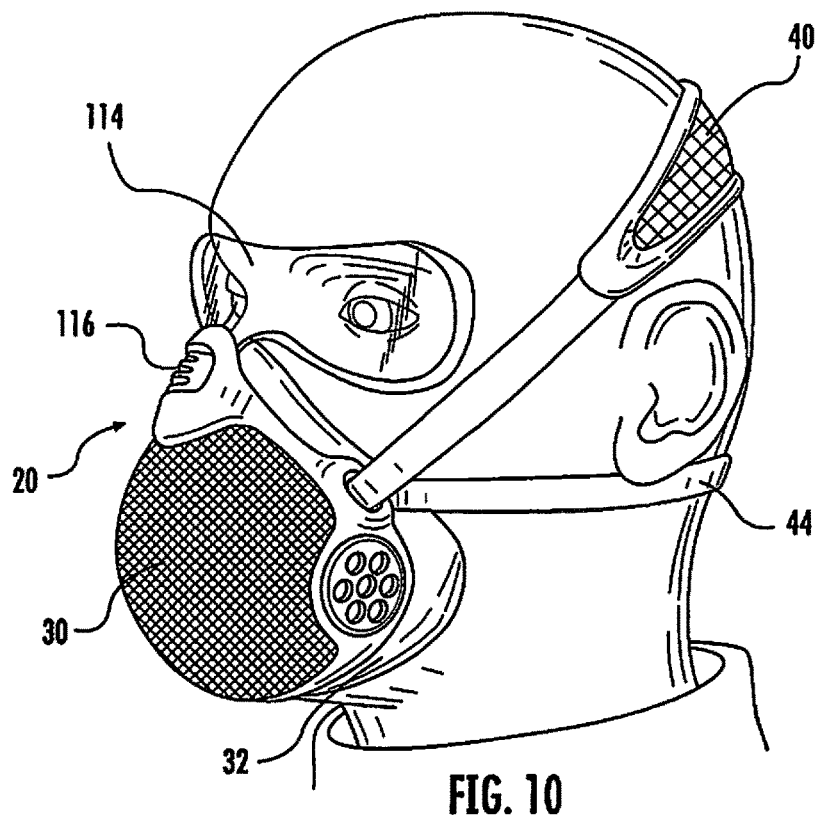
FIG. 10 illustrates an embodiment of the invention having a frame member to fix the filter within the support piece, and the optional attachment of goggles to the mask; and, FIG. 11 illustrates an expanded view of the embodiment of FIG. 10.
Figure 11:
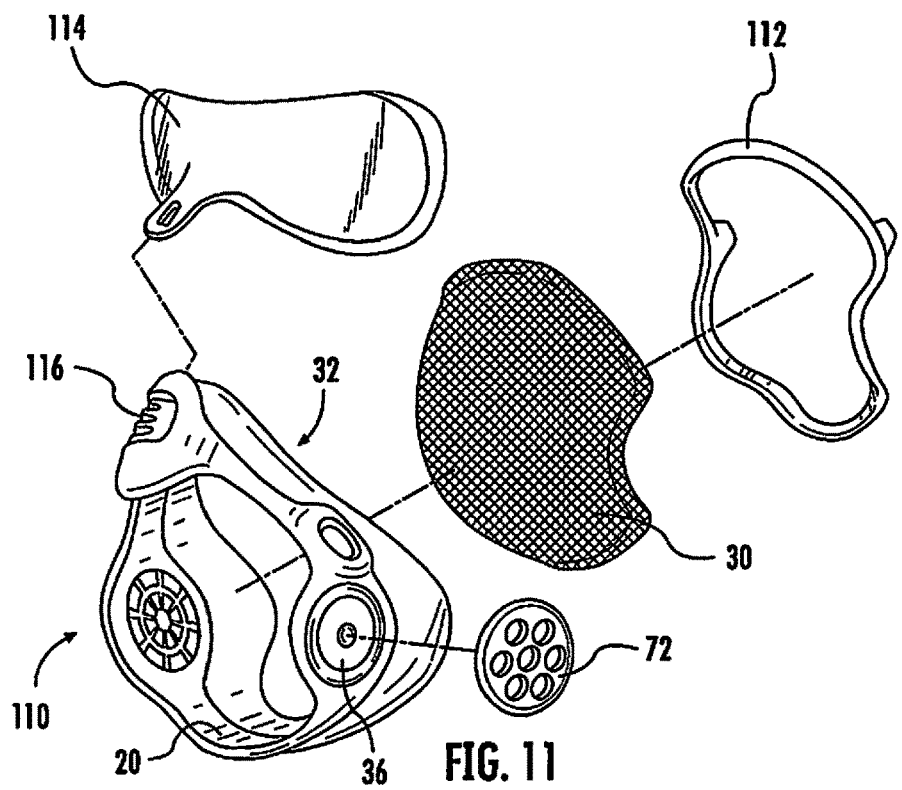

As seen in FIGS. 10 and 11, the half facepiece 100 of the invention may include the support piece 20 having silicone or TPE face sealing edge 32 with the support piece 20 forming an opening 110 for placement of the molded filter 30 therein. The support piece 20 includes a hard plastic body with the soft molded sealing edge 32 molded together. In this embodiment, the support piece 20 incorporates multiple laterally placed exhaust valve 36, e.g., two, with each exhaust valve 36 located behind a cover 72. The mask 100 further incorporates a frame member 112 that seals the filter 30 to the support piece 20. The frame member 112 may be detached for filter 30 insertion and removal, e.g., replacement of the filter 30. The filter 30 includes a shaped molded particle filter 30 that is placed within the inside of the support piece 20 and retained within the support piece 20 with the frame member 112. Safety goggles 114 may be attached to the upper portion of the support piece 20, preferably using a quick release mechanism 116 for attachment and detachment of the safety goggles to the mask 100.

In operation, the half facepiece 100 is easily donned or doffed for convenient cleaning and decontamination. The filter 30 is removed from the support piece 20 and as such each component may be most efficiently clean. In high use area, the filter 30 may be removed and the support piece 20 and head harness 40 may be cleaned locally and immediately used with a new filter 30. The quick release mechanism 42 further advances this rapid turnaround of equipment use.

While certain embodiments of the disclosure have been described herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A half facepiece, comprising:
   a non-porous support piece;
   a head harness detachably connected to the support piece;
   at least one porous filter removably adjacent to the support piece, the support piece fixing the position of the at least one filter to the half facepiece, the filter allowing air to pass therethrough and separating contaminants from the air;
   a sealing edge molded directly to the at least one filter; and
   a grille of slotted overlays configured to deflect spray and prevent splashed liquids from passing through the grille and into contact with the at least one filter.

2. The half facepiece of claim 1, wherein the composition of the sealing edge is selected from the group consisting of silicone, TPE and combinations thereof.

3. The half facepiece of claim 1, wherein the support piece is at least partially transparent.

4. The half facepiece of claim 3, wherein the support piece is fully transparent.

5. The half facepiece of claim 1, wherein the head harness is connected to the support piece with a quick release clip.

6. The half facepiece of claim 1, further comprising at least one exhaust valve, the exhaust valve positioned to transmit exhaust air through the support piece.

7. The half facepiece of claim 1, wherein the head harness includes a net head crown support.

8. The half facepiece of claim 1, further comprising a frame member for supporting the at least one filter within the support piece.

9. The half facepiece of claim 1, wherein the at least one filter is supported against the user's face with the compressive force of the support piece.

10. The half facepiece of claim 1, wherein the at least one filter is fixed inside of the support piece and the upper section of the support piece includes at least one opening for airflow therethrough and into the at least one filter.

11. The half facepiece of claim 1, wherein the grille includes slotted overlays of plastic ridges.

12. The half facepiece of claim 1, wherein the at least one filter includes an exhaust valve port.

* * * * *